[19] United States Patent
Hao et al.

[11] Patent Number: 5,828,866
[45] Date of Patent: Oct. 27, 1998

[54] REAL-TIME SYNCHRONIZATION OF CONCURRENT VIEWS AMONG A PLURALITY OF EXISTING APPLICATIONS

[75] Inventors: Ming C. Hao, Los Altos Hills; Joseph S. Sventek, Oakland, both of Calif.

[73] Assignee: Hewlett-Packard Company, Palo Alto, Calif.

[21] Appl. No.: 676,762

[22] Filed: Jul. 8, 1996

[51] Int. Cl.⁶ ...................................................... G06F 9/46
[52] U.S. Cl. .................... 395/500; 395/200.34; 395/566; 395/701
[58] Field of Search .............................. 395/500, 187.01, 395/200.3, 200.34, 682, 683, 701, 566; 370/229, 230, 260, 263, 266, 270

[56] References Cited

U.S. PATENT DOCUMENTS

| | | | |
|---|---|---|---|
| 5,487,167 | 1/1996 | Dinallo et al. | 395/650 |
| 5,490,247 | 2/1996 | Tung et al. | 395/152 |
| 5,537,408 | 7/1996 | Branstad et al. | 370/79 |
| 5,680,619 | 10/1997 | Gudmundson et al. | 395/701 |
| 5,689,708 | 11/1997 | Regnier et al. | 395/682 |

FOREIGN PATENT DOCUMENTS

| | | | |
|---|---|---|---|
| 0 251 584 | 1/1988 | European Pat. Off. | G06F 9/46 |

OTHER PUBLICATIONS

DePaoli et al., "Coordinator: A Basic Block for Multimedia Conferencing Systems", IEEE, 1991, pp. 2049–2053.

Hao et al., "Collaborative Computing: A Multi–Client Multi–Server Environment", 1995, pp. 206–213, Database Inspec Institute of Electrical Engineers, Stevenage, GB, Inspec No. 5125203.

Prakash et al., "DistView: support for Building Efficient Collaborative Applications Using Replicated Objects", 1994, pp. 153–164, Proceedings of the Conference on Computer Supported Cooperative Work.

Fromme et al. "An Open Architecture for Tool and Process Integration", 1993, pp. 50–62, Proceedings of the 1993 Conference on Software Engineering Environments.

Karsenty et al., "Group Design: Shared Editing in a Heterogeneous Environment", 1993, vol. 6(2), pp. 167–195, Computing Systems.

Sriram et al., "A Transaction Management Framework for Collaborative Engineering", 1992, vol. 8(4), pp. 213–232, Engineering With Computers.

Sventek, IEEE Computer Society Office Automation Symposium, "An Architecture Supporting Multi–Media Integration", 1987, pp. 46–56, IEEE Computer Society Office Automation Symposium, Database Inspec Institute of Electrical Engineers, Stevenage, GB, Inspec No. 2967185.

S. R. Ahuja, J.R. Ensor, S.E. Lucco, "AComparison of Application Sharing Mechanisms in Real–Time Desktop Conferencing Systems", ACM,pp. 238–248.

D. Garfinkel, R. Branson, "A Comparison o f Application Sharing Architectures in the X Environment", Xhibition 91, pp. 64–74.

(List continued on next page.)

Primary Examiner—Kevin J. Teska
Assistant Examiner—Thai Phan

[57] ABSTRACT

A synchronization system includes a motion event synchronizer and multiple application encapsulators which operate together to synchronize motion events operating in replicated multi-dimensional non-modified 3-D existing applications. The application encapsulators compress one or more user generated motion events together and then send the compressed motion events to the motion event synchronizer. The motion event synchronizer multi-casts the motion event to each of the application encapsulators in the synchronization system. The application encapsulators and the motion event synchronizer conduct a two-phase lock-step acknowledge and download enable protocol that ensures each application is downloaded with the same motion event at the same time. To ensure simultaneous motion event viewing at each user site, the application encapsulators interleave spacer events between adjacent motion events.

20 Claims, 4 Drawing Sheets

OTHER PUBLICATIONS

T. Gutekunst, D. Bauer, "A Distributed and Policy–Free General–Purpose Shared Window System", IEEE Transactions on Networking, vol. 3, No. 1, Feb. 1995, pp. 51–61.

Crowley, Terrance, et al., "MMConf: An Infrastructure for Building Shaed Multimedia Applications", CSCW Oct. 1990, pp. 329–339.

Lantz, K.A.,"An Experiment in Integrated Multimedia Conferencing", CSCW 86 Conference, pp. 267–275.

Ellis, C. et al., "Design and Use of a Group Editor", Working Conference on Engineering for Human Computer Interactions, 1989, pp. 13–28.

Cooper, E. C., "Replicated Distributed Programs", In Proc. 10th Symposium on Operating Systems, ACM,Dec. 1985, pp. 63–78.

Lauwers, J. Chris, "Replicated Architectures for Shared Window Systems: A Critique" ACM, 1990, pp. 249–260.

Zabele, Stephen, "High Performance Infrastructure for Visually–Intensive CSCW Applications", ACM CSCW 94, pp. 395–403.

REAL-TIME SYNCHRONIZATION OF CONCURRENT VIEWS AMONG A PLURALITY OF EXISTING APPLICATIONS

BACKGROUND OF THE INVENTION

This invention relates generally to computer-aided design/computer-aided manufacturing (CAD/CAM), multimedia and any other system that supports simultaneous viewing and manipulation of electronically captured multi-dimensional images and/or graphics by multiple users and, more particularly, to a system for manipulating and synchronizing motion events at different user workstations without changing the existing motion event applications.

Industries that manufacture motor vehicles, airplanes and other complex mechanical equipment, require designers and engineers to work concurrently on the same large complex design. The ability to work concurrently on the same design allows multiple users to collaborate on design changes in real-time reducing overall design time and improving the quality of the final designed product.

Computer systems allow designers and engineers to electronically capture and manipulate multi-dimensional design image/graphics. The computer software that electronically captures, displays and manipulates images or graphics displayed on a computer screen is referred to generally as an application. In order for more than one user to view or work on the same electronically captured image at the same time, the application must be shared with each user workstation site. The shared application should provide concurrent and consistent views (windows) of the same image in real-time at each user workstation.

Existing shared applications are based on two general architectures. A centralized architecture contains only one instance of the shared application. Inputs to the application are sent to a single execution site. The application's output at the execution site is then sent to each user display in the computer system. The centralized architecture provides identical views by transmitting the same protocol to each user display. A replicated architecture executes a copy of each shared application locally at each user workstation. User inputs and outputs to and from the shared application remain localized on the user workstation.

Examples of centralized architectures are SharedX described in "A Comparison of Application Sharing Architectures in the X Environment," Xhibition 91, Daniel Garfinkel, Randy Branson; and JVTOS' Shared Window System described in "A Distributed and Policy-Free General-Purpose Shared Window System" IEEE 1995, Thomas Gutekunst, Daniel Bauer. Examples of replicated architectures are MMConf, described in "MMConf: An Infrastructure for Building Shared Multimedia Applications", CSCW 1990, TelTence Crowley, Paul Milazzo; and VConf, described in "An Experiment in Integrated Multimedia Conferencing", CSCW 86 Conference.

View consistency problems typically do not occur in centralized architectures since only one copy of the application is executed. However, centralized architectures must transfer all input and output ("I/O") data between each user site and the shared application at the execution site. The I/O data increases network traffic between user workstations. Because networks have limited bandwidth, only a limited number of users can use a centralized shared application architecture at the same time.

Replication architectures significantly reduce network traffic and have faster response times since I/O data remains localized at the user workstation. However, replication architectures have difficulty maintaining synchronized motion views among the multiple copies of the image displayed on each user workstation.

Accordingly, a need remains for improving real-time view synchronization in replicated application architectures while at the same time improving response time and reducing network data traffic.

SUMMARY OF THE INVENTION

A synchronization system includes a motion event synchronizer and multiple application encapsulators which operate together to synchronize motion events in existing applications. The invention operates in synchronizing for image or graphic motion events displayed or manipulated by the existing applications. The synchronization system is installed without recompiling, relinking or otherwise modifying existing applications on different workstations. The improved view synchronization provided by the present invention can, therefore, be used with a wide variety of existing design tools.

Application encapsulators encapsulate the existing applications. The application encapsulators compress one or more user generated motion events and send the compressed motion events to the motion event synchronizer. The motion event synchronizer multi-casts the compressed motion events to each activated application encapsulator in the synchronization system. Multiple user generated motion events can be grouped together for transferring to the motion event synchronizer. Compressing and transmitting groups of motion events further reduces data traffic between the motion event synchronizer and the application encapsulators. Using the lock-step motion event download protocol with groups of motion events adds additional parallelism between the motion events downloaded to each application.

The application encapsulators and the motion event synchronizer conduct a two-phase acknowledge and download enable communication protocol that ensures each application is downloaded to the same motion event at the same time. To further ensure simultaneous motion event viewing at each user site, the application encapsulators interleave spacer events between downloaded motion events. The spacer events prevent the different applications from processing motion events in different sequences. Each application encapsulator sends a "done" signal to the application synchronizer after downloading the motion event to the encapsulated application. The synchronizer waits for a download acknowledgement from each application encapsulator before multi-casting the next motion event.

The foregoing and other objects, features and advantages of the invention will become more readily apparent from the following detailed description of a preferred embodiment of the invention which proceeds with reference to the accompanying drawings.

DETAILED DESCRIPTION

Figure 1:
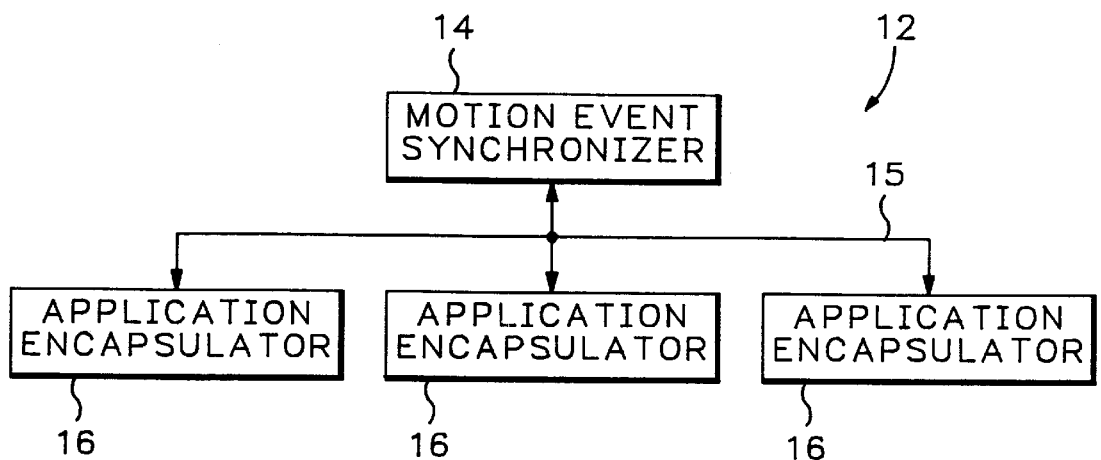
FIG. 1 is a diagram of a motion event synchronization system according to the invention.

Referring to FIG. 1, a synchronization system 12 includes a motion event synchronizer 14 for conducting a real-time concurrent collaboration session. Multiple application encapsulators 16 are loaded onto platforms such as workstations. Each workstation includes CAD/CAM applications, multimedia applications or any other existing applications where it is desireable to display multiple replicated views in real-time. The platforms where the application encapsulators reside and the motion event synchronizer reside are typically connected together through a local area network (LAN) 15.

Figure 2:
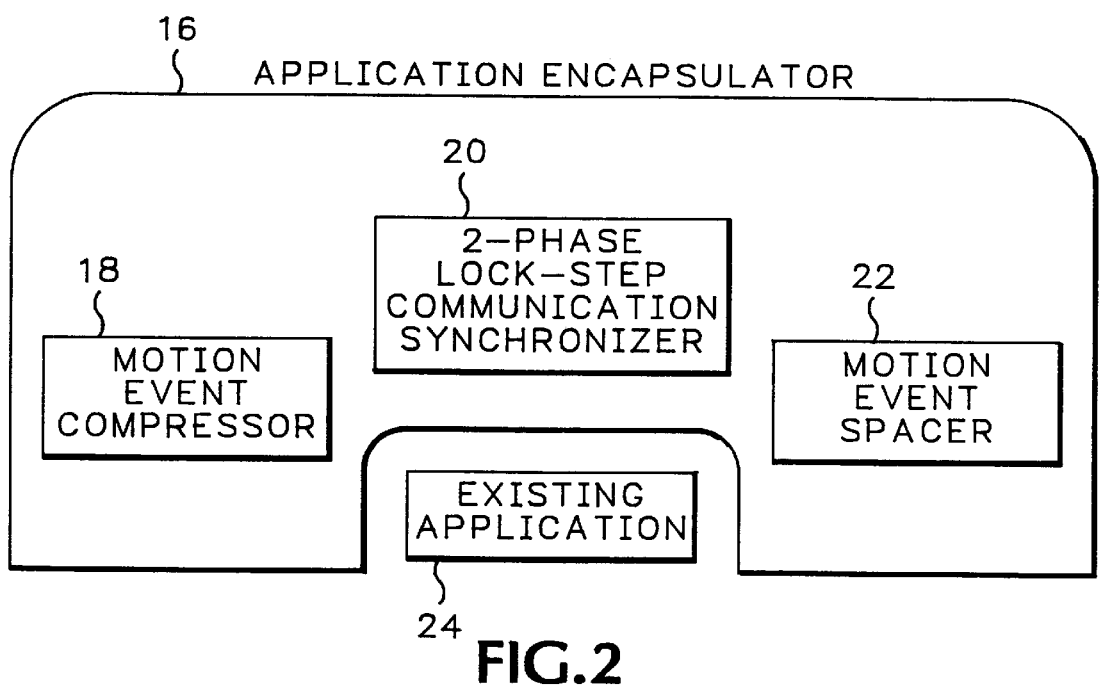
FIG. 2 is a detailed diagram of an application encapsulator for the synchronization system shown in FIG. 1.

The motion event synchronizer 14 communicates with the application encapsulators in order to synchronize motion events displayed through the existing replicated applications on each user platform (see FIG. 2). The motion event synchronizer 14 receives one or more incoming motion events from one of the application encapsulators 16 and then multi-casts the motion events to each active application encapsulator 16 accessing motion event synchronizer 14.

The motion event synchronizer 14 waits for an acknowledgement from each application encapsulator 16 to ensure that the applications start the motion event at the same time. After receiving an acknowledgement from each encapsulator, the synchronizer directs downloading of the motion event to their respective applications. The motion event synchronizer then waits for a second acknowledgement from each application encapsulator before multi-casting another motion event.

Referring to FIG. 2, the application encapsulators 16 each include a motion event compressor module 18, a 2-phase lock-step communication synchronizer module 20 and a motion event spacer module 22. The application encapsulator 16 encapsulates motion event communications around an existing application 24 loaded on the local user workstations. The application encapsulator 16 receives and transmits data in the format and protocol used by the existing application 24. Thus, the encapsulator 16 can operate in conjunction with the existing application 24 without recompiling, relinking or modifying the existing application program 24.

The motion event compressor 18 reduces network traffic on the LAN 15 (FIG. 1) by compressing and grouping one or more motion events together before sending the motion events to motion event synchronizer 14. The compressed group of motion events are transmitted to the motion event synchronizer and then multi-cast to each application encapsulator. Motion event compressors, such as compressor 18, are well known to those skilled in the art and is, therefore, not described in detail.

Sending groups of motion events to the motion event synchronizer at the same time improves system parallelism and further reduces data traffic. If groups of motion events are multi-cast from the motion event synchronizer 14 to the application encapsulators, each application will necessarily process the same sequence of motion events at the same time without requiring the lock-step synchronization protocol for each motion event. Thus, network communication overhead is reduced and the execution parallelism between each replicated application is increased.

The communication synchronizer 20 includes a distributed agent that conducts a 2-phase lock-step communication protocol with the motion event synchronizer 14. The lock-step protocol in synchronizer module 20 is used to synchronize downloading of motion events to the applications. Thus, all of the applications 24 receive and initiate the same motion events at the same time.

Multiple motion events can reside next to each other in the existing application's event queue. Window systems, such as the Motif event processing mechanism, collapse adjacent motion events together. If one window system collapses motion events together and another window system does not collapse motion events together, different window systems may process motion events out of sequence, thus displaying motion events at different times. The motion event spacer 22 interleaves event spacers between adjacent motion events. The event/spacers prevent the applications 24 from collapsing two or more motion adjacent events together. Thus, the same motion event will be executed by each application at the same time.

Figure 3:
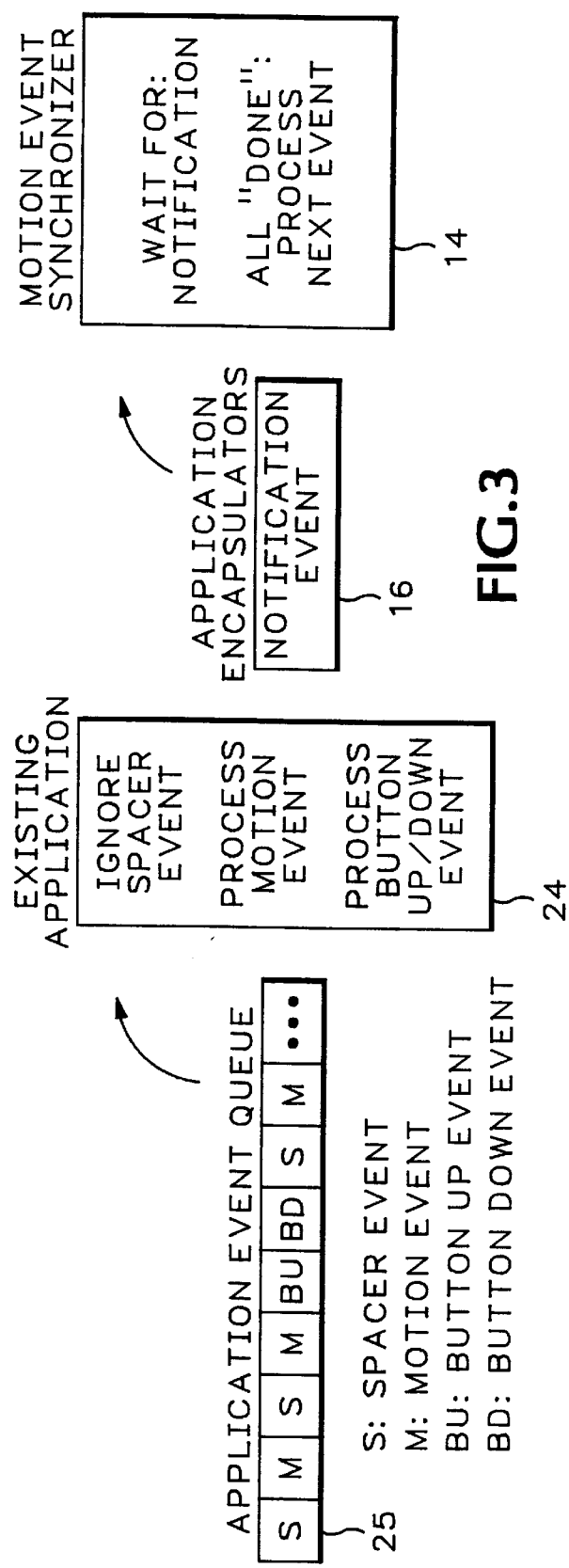
FIG. 3 is a diagram of an application event queue with spacer events inserted by the application encapsulator.

Referring to FIG. 3, the existing application 24 includes an application event queue 25 that stores motion events "M", button up events "IBU" and button down events "BD". The motion event spacer module 22 (FIG. 2) attaches a spacer event "S" to each motion event "M" before downloading the motion event to the application 24. Each motion event "M" in the event queue 25 is then interleaved with a spacer event "S".

The application 24 ignores the spacer events "S" and processes the motion events and button events in a normal manner. The spacer events "S" keep the application (e.g., Motif) from collapsing normally adjacent motion events together. Therefore, each motion event "M" sent from the motion event synchronizer 14 is processed by each encapsulated application in the same order and at the same time. The application encapsulators 16 each notify the motion event synchronizer 14 when the motion event is downloaded to the existing program. The motion event synchronizer 14 waits for a notification from each encapsulator before processing the next event.

Figure 4:
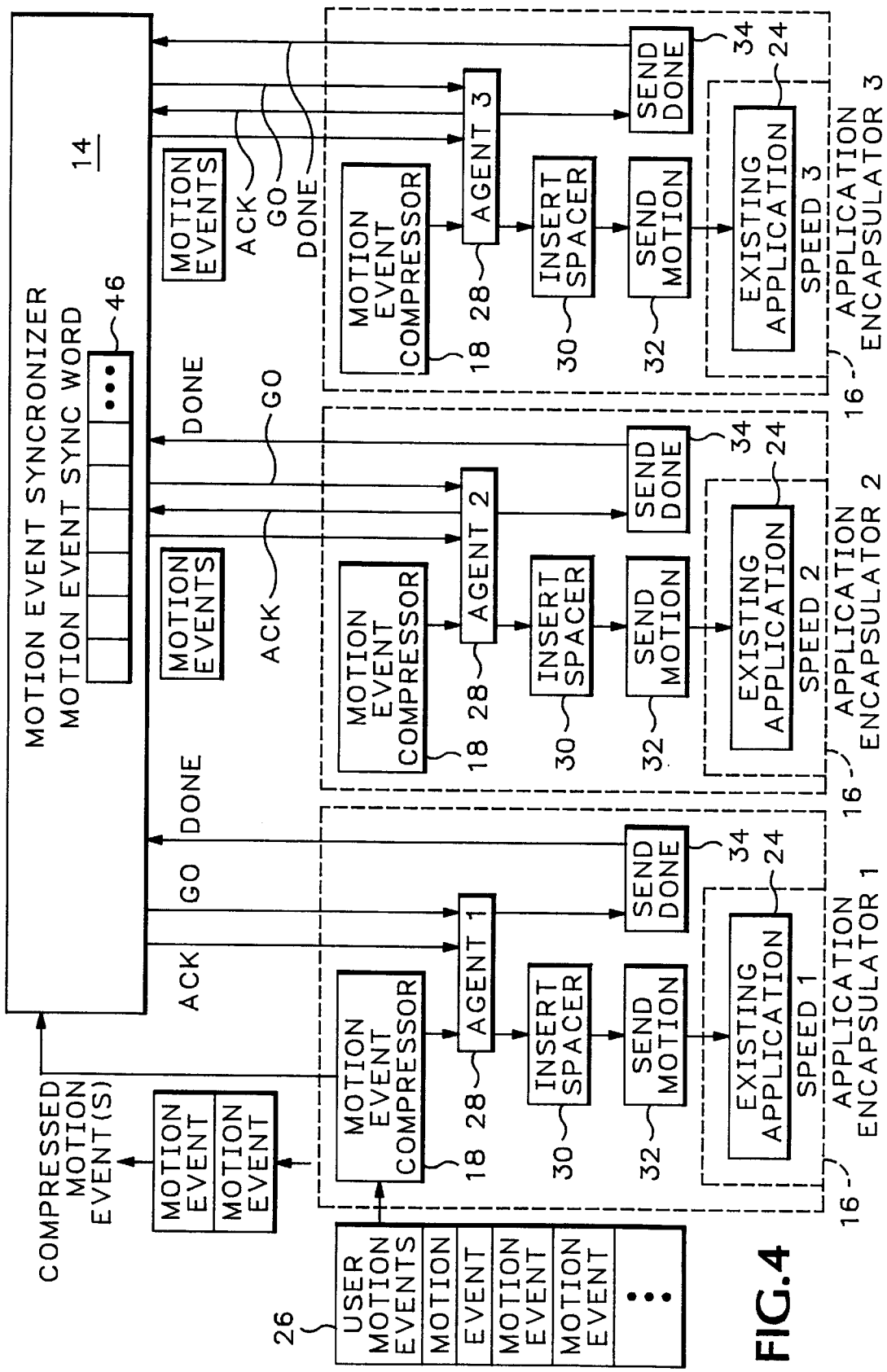
FIG. 4 is a data flow diagram for the synchronization system shown in FIG. 1.

Referring to FIG. 4, each application encapsulator 16 includes an agent 28 that conducts the two-phase communication protocol with the motion event synchronizer 14. One or more user motion events 26, such as from a mouse, are generated from one of the user workstations and input to the motion event compressor 18. The motion event is output from the compressor to motion event synchronizer 14. "ACK" and "go" signals are used between the motion event synchronizer and the application encapsulators for conducting the two-phase lock-step protocol.

An insert spacer module 30 attaches spacer events to the motion events sent from the motion event synchronizer 14. A send motion module 32 controls motion event downloading to the existing application 24. A send done module 34 transmits a done signal to the motion event synchronizer 14 after a motion event is downloaded to the application. It is of significant importance that all modules in the application encapsulator 16 operate independently of the existing application 24. Therefore, the synchronization system 12 is operable with different applications without modifying existing application software.

Figure 5:
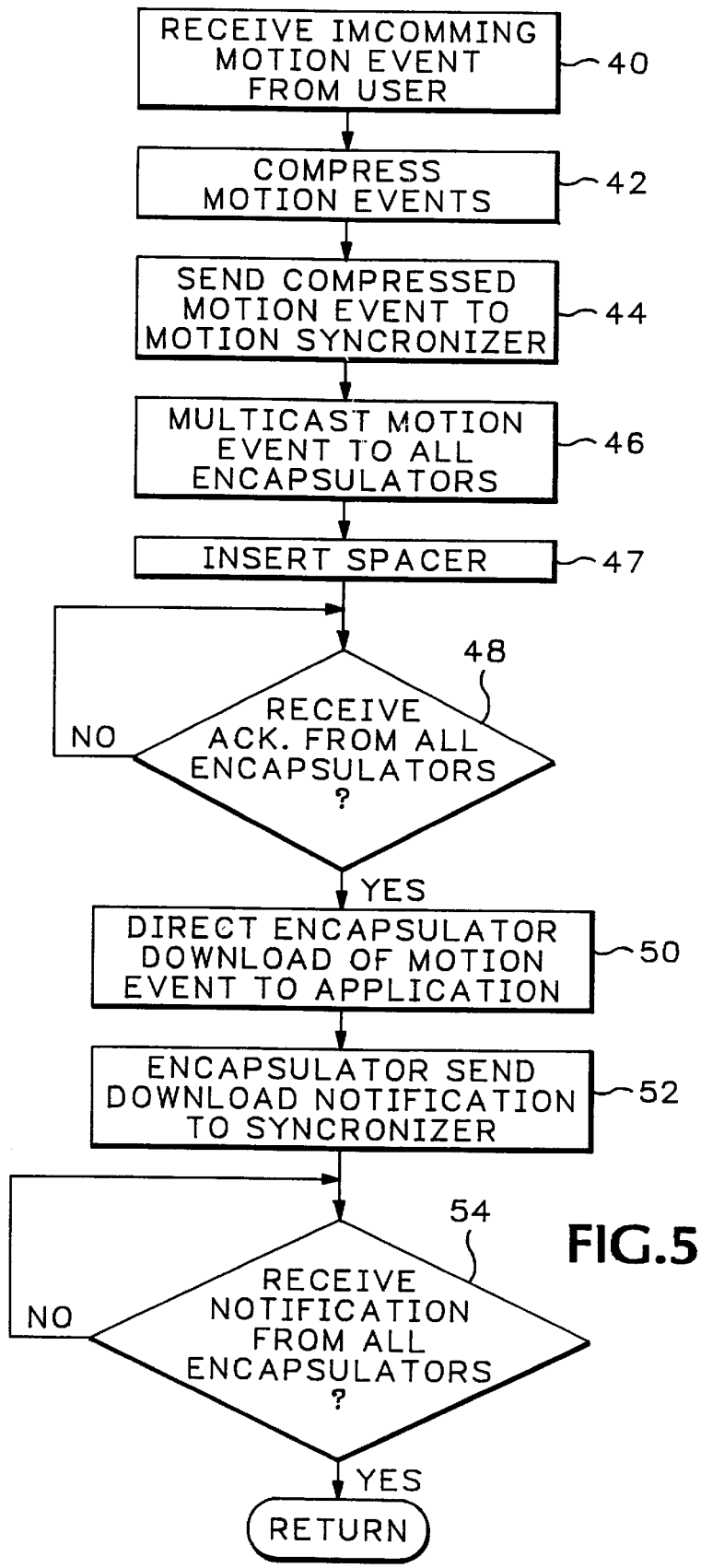
FIG. 5 is a step diagram showing the operations performed by the synchronization system.

Referring to FIGS. 4 and 5, the synchronization system operates in the following manner. In step 40, the motion event compressor receives one or more incoming motion events 26 from a user workstation. For example, multiple motion events may direct a rotation sequence generated by a user from the workstation mouse. The motion event compressor 18 compresses the single motion event or group of motion events according to a current user input speed and a predefined threshold in step 42. The user input speed, for example, is the selected mouse cursor speed that the user selects for moving the mouse cursor across a computer screen. The threshold is a predefined time interval where all motion events within the time interval are compressed together.

In step 44, the motion event compressor 18 sends the compressed motion events to the motion synchronizer 14 over LAN 15 (FIG. 1). The motion event synchronizer 14, in step 46, multi-casts the motion events to all other application encapsulators currently accessing the synchronization system. Each agent 28 sends an acknowledge "ACK" signal to motion event synchronizer 14 upon receiving the motion events. In step 47, the spacer module 30 in each application encapsulator interleaves a spacer between adjacent motion events before downloading the motion events to the application queue (FIG. 3).

In decision step 48, the motion synchronizer 14 waits for the "ACK" signal from each application encapsulator 16. In step 50, the motion event synchronizer 14 sends a "go" signal after receiving "ACK" from all the agents 28. The "go" signal directs each send motion module 32 to download the motion events to the existing application 24. Step 52 sends a "done" signal, via the send done module 34, to the motion synchronizer 14 on behalf of the application 24. The motion event synchronizer 14, in decision step 54, waits for "done" signals from each application encapsulator 16 before multi-casting another motion event or group of motion events.

The invention can be used with any application where replicated motion events are shown on more than one display at the same time. For example, multiple windows opened on the same workstation can take advantage of the invention to fill out multiple forms at the same time. The invention can also be used in text applications. For example, multiple replicated displays from word processor applications may be synchronized at two different work stations at the same time.

The synchronization system provides shared multiple consistent views in real-time. The invention operates with existing multi-dimensional applications without requiring any modification to the existing applications. Thus, the invention is adaptable to any shared graphic or video multimedia application or real-time visual integration system. The motion events transmitted between the motion event synchronizer 14 and the application encapsulators are compressed. Therefore, the synchronization system utilizes relatively little network bandwidth and can be scaled up to support a large number of users at the same time. More than one motion event can be multi-cast at the same time to further reduce data traffic and increase application parallelism.

Having described and illustrated the principles of the invention in a preferred embodiment thereof, it should be apparent that the invention can be modified in arrangement and detail without departing from such principles. I claim all modifications and variation coming within the spirit and scope of the following claims.

We claim:

1. A motion event synchronization system, comprising:
    multiple existing replicated applications located locally on user workstations for generating motion events initiated directly from user inputs;
    a motion event synchronizer for receiving and multi-casting the motion events; and
    multiple application encapsulators each operating in conjunction with an associated one of the multiple existing applications, the multiple application encapsulators controllably downloading the motion events multi-cast from the motion event synchronizer independently of the associated applications and the user inputs and then loading the downloaded motion events to the associated existing applications according to a motion event synchronizer.

2. A system according to claim 1 wherein each one of the multiple application encapsulators includes a motion event compressor for compressing the motion events generated by the associated existing applications according to a current user input speed and a predefined time interval.

3. A system according to claim 1 wherein the encapsulators interleave a spacer event between the motion events before downloading the motion events to the associated existing applications, the spacer event preventing the existing applications from collapsing adjacent motion events together.

4. A system according to claim 1 wherein the application encapsulators each transmit an acknowledge signal to the motion event synchronizer after receiving the multi-cast motion events.

5. A system according to claim 4 wherein the motion event synchronizer generates a "go" signal after all application encapsulators have transmitted the acknowledge signal, the "go" signal directing the application encapsulators to download the motion events.

6. A system according to claim 5 wherein each of the application encapsulators generates a done signal to the motion event synchronizer after downloading the motion events to the associated image applications, the motion event synchronizer multi-casting a second one of the motion events after receiving a done signal from each one of the application encapsulators.

7. A system according to claim 1 wherein each one of the existing applications comprises existing three-dimensional display programs and the motion event synchronizer and the application encapsulators communicate and transfer motion events independently of the three-dimensional display programs.

8. A system according to claim 1 wherein at least two of the multiple application encapsulators and the associated existing applications are loaded on workstations located in different physical locations and the motion event synchronizer is located at a third location accessible from each workstation location through a local area network.

9. A method for synchronizing a motion event in a multi-user viewing system having replicated applications, the method comprising:
    individually encapsulating the replicated applications with separate associated application encapsulators each one of the application encapsulators operating independently from the other application encapsulators;
    transmitting the motion event from one of the application encapsulators to a motion event synchronizer;
    transmitting the motion event from the motion event synchronizer to each one of the application encapsulators without communicating with the replicated applications; and
    downloading the motion event to the replicated applications from the associated application encapsulators after the motion event synchronizer determines each of said application encapsulators has received the motion event.

10. A method according to claim 9 including compressing the motion event with one of the application encapsulators before transmitting the motion event to the motion event synchronizer.

11. A method according to claim 9 including the following steps:
    generating an acknowledge signal with each one of the application encapsulators after receiving the motion event; and downloading the motion event after each one of the application encapsulators generates the acknowledge signal.

12. A method according to claim 9 including attaching a spacer to the motion event downloaded to the replicated applications.

13. A method according to claim 9 including conducting a 2-phase lock-step communication protocol between each one of the application encapsulators and the motion event synchronizer before downloading the motion events to the replicated applications.

14. A method according to claim 9 including generating a done signal from each one of the application encapsulators to the motion event synchronizer after downloading the motion event to the associated replicated applications.

15. A method according to claim 14 including waiting for each one of the application encapsulators to generate the done signal before transmitting another motion event from the synchronizer controller.

16. A method according to claim 9 including the following steps:

storing different motion events in an application event queue;

interleaving spacer events between the different motion events in the event queue;

processing the stored motion events within one of the replicated applications in a sequential order defined by the spacer events; and ignoring processing of the spacer events.

17. A method according to claim 9 including generating multiple user generated motion events;

grouping the multiple motion events together;

transmitting the group of motion events from one of the application encapsulators to the motion event synchronizer; and multi-casting the group of motion events to each one of the application encapsulators.

18. A method according to claim 9 including encapsulating the replicated applications and transmitting the motion events from the application encapsulators without modifying any of said replicated applications.

19. A method according to claim 9 including transmitting the motion event from one of the application encapsulators to the motion event synchronizer and then multi-casting the motion event to all remaining application encapsulators in real time immediately after the motion event is generated from one of the replicated applications.

20. A method for synchronizing motion events in a CAD/CAM system having multiple existing application programs located on different workstations, the method comprising:

loading an application encapsulator on each workstation having one of the existing application programs;

replicating an image locally at each workstation;

generating a motion event initiated directly from a user to one of the existing application programs that initially modifies the image only locally at the workstation generating the motion event;

compressing the motion event with the application encapsulator;

transmitting the compressed motion event to a motion event synchronizer independently of the application programs;

multi-casting the compressed motion event from the motion event synchronizer to each application encapsulator independently of the application programs;

acknowledging reception of the compressed motion event with each application encapsulator independently of the application programs;

attaching a spacer event to each received compressed user motion with each application encapsulator that prevents the application programs from combining the motion event with other motion events; and enabling each application encapsulator to download the compressed user motion and spacer event to an event queue in the existing application programs after each application encapsulator has acknowledged reception of the compressed user motion to the motion event synchronizer.

* * * * *